United States Patent
Abeloe

(10) Patent No.: US 10,085,014 B1
(45) Date of Patent: *Sep. 25, 2018

(54) METHODS AND APPARATUSES FOR VIEWING THREE DIMENSIONAL IMAGES

(71) Applicant: Virginia Venture Industries, LLC, Centreville, VA (US)

(72) Inventor: Kenneth A. Abeloe, Carlsbad, CA (US)

(73) Assignee: Virginia Venture Industries, LLC, Centrevile, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/433,783

(22) Filed: Feb. 15, 2017

Related U.S. Application Data

(63) Continuation of application No. 14/543,447, filed on Nov. 17, 2014, now Pat. No. 9,578,316, which is a
(Continued)

(51) Int. Cl.
| | |
|---|---|
| *H04N 13/04* | (2006.01) |
| *G09G 5/00* | (2006.01) |
| *H04N 7/18* | (2006.01) |
| *H04N 13/00* | (2018.01) |
| *H04N 15/00* | (2006.01) |
| *H04N 9/47* | (2006.01) |
| *H04N 13/341* | (2018.01) |
| *H04N 13/354* | (2018.01) |
| *H04N 13/363* | (2018.01) |
| *H04N 13/368* | (2018.01) |

(Continued)

(52) U.S. Cl.
CPC ......... *H04N 13/341* (2018.05); *H04N 13/045* (2013.01); *H04N 13/047* (2013.01); *H04N 13/0438* (2013.01); *H04N 13/0459* (2013.01); *H04N 13/0475* (2013.01); *H04N 13/0497* (2013.01); *H04N 13/354* (2018.05); *H04N 13/363* (2018.05); *H04N 13/368* (2018.05); *H04N 13/373* (2018.05); *H04N 13/398* (2018.05)

(58) Field of Classification Search
CPC ............. H04N 13/0438; H04N 13/045; H04N 13/0459; H04N 13/047; H04N 13/0475; H04N 13/0497
USPC .......................................................... 348/51
See application file for complete search history.

(56) References Cited

U.S. PATENT DOCUMENTS

| | | |
|---|---|---|
| 6,593,957 B1 | 7/2003 | Christie |
| 6,715,353 B2 | 4/2004 | Johnson |

(Continued)

OTHER PUBLICATIONS

Theobalt et al., "Reconstructing Human Shape, Motion and Appearance from Multi-view Video," Three-Dimensional Television, 2008.
(Continued)

*Primary Examiner* — Hee-Young Kim
(74) *Attorney, Agent, or Firm* — Knobbe, Martens, Olson & Bear, LLP

(57) ABSTRACT

Systems and methods for viewing stereoscopic television are described. The methods generate stereoscopic views from 3D content; synchronize with external view ware (e.g., shuttered glasses) to include shutter information and viewing geometry; sequence 3D content for multiple viewers at multiple perspective views; and output to a display component for viewing.

11 Claims, 14 Drawing Sheets

Related U.S. Application Data continuation of application No. 13/096,903, filed on Apr. 28, 2011, now Pat. No. 8,890,941.

(60) Provisional application No. 61/329,478, filed on Apr. 29, 2010.

(51) Int. Cl.
 *H04N 13/373* (2018.01)
 *H04N 13/398* (2018.01)

(56) References Cited

U.S. PATENT DOCUMENTS

| | | |
|---|---|---|
| 6,954,202 B2 | 10/2005 | Han et al. |
| 7,219,033 B2 | 5/2007 | Kolen |
| 7,286,143 B2 | 10/2007 | Kang et al. |
| 7,289,539 B1 | 10/2007 | Mimberg |
| 7,333,165 B2 | 2/2008 | Nakano et al. |
| 7,652,665 B2 | 1/2010 | Fukushima et al. |
| 8,890,941 B2 | 11/2014 | Abeloe |
| 2003/0071893 A1 | 4/2003 | Miller et al. |
| 2004/0223218 A1 | 11/2004 | Putilin et al. |
| 2009/0109126 A1* | 4/2009 | Stevenson .............. B60K 37/00 345/4 |
| 2010/0098326 A1 | 4/2010 | Abeloe |
| 2010/0177171 A1* | 7/2010 | Marcus .............. G02B 27/2264 348/53 |

OTHER PUBLICATIONS

Rademacher, P., University of North Carolina at Chapel Hill, "View-Dependent Geometry", Computer Graphics Proceedings, Annual Conference Series, 1999.

Next-gen iPhone to sport MEMS gyroscope?, MacWorld, MacWorld Staff.

Williams, M., "How Does a Nintendo Wii Sensor Work?", eHow, 2007.

Kubota et al., "Multi-View Imaging and 3DTV," (Special Issue Overview and Introduction), Jul. 27, 2007.

Khoshabeh et al., "View Synthesis for Multi-View Auto-Stereoscopic Displays," Conference Abstract from UCSD Jacobs School of Engineering Research Expo, 2010.

* cited by examiner

METHODS AND APPARATUSES FOR VIEWING THREE DIMENSIONAL IMAGES

CROSS-REFERENCE TO RELATED APPLICATIONS

This application is a continuation of U.S. patent application Ser. No. 14/543,447, filed Nov. 17, 2014, now U.S. Pat. No. 9,578,316, which is a continuation of U.S. patent application Ser. No. 13/096,903 filed Apr. 28, 2011, now U.S. Pat. No. 8,890,941, which claims the benefit of U.S. Provisional No. 61/329,478, filed Apr. 29, 2010. All of these applications are incorporated, in their entirety, by reference herein.

BACKGROUND

Field of the Invention

The present invention relates generally to the field of generating and displaying three-dimensional images, such as for example three dimensional television systems.

Description of the Related Technology

Three dimensional movies have become popular. However, the conventional three dimensional movies lack the true three dimensional experience. In particular, when a viewer sees a movie, the viewer is presented with one particular point of view of a three dimensional scene. If the viewer is presented with a frontal scene of a person, the viewer cannot see the side, top or bottom of the person. It would be desirable to create three dimensional movies such that a viewer can see the side, top and/or bottom of the person.

Virtual reality (VR) machines are also known. VR machines relate to the generation and rendering an interactive viewpoint video in which a user can watch a dynamic scene while changing the viewpoint at will. An example is described in U.S. Pat. No. 7,286,143 issued to Kang et al. However, such devices cannot provide simultaneous multiple perspective views that can be shared among multiple viewers at the same time using a single displaying device.

SUMMARY OF CERTAIN INVENTIVE ASPECTS

It would be desirable to provide a three dimensional display system in which multiple users can share the experience of watching a movie scene with different perspective views. The present invention provides devices such as televisions, projections and others to allow systems and/or methods to present one or more viewers with a true three dimensional experience. In some embodiments, a television for displaying stereoscopic images is provided. The television may include an image engine configured to generate a plurality of stereoscopic scenes. A stereoscopic scene can include at least two pairs of stereoscopic conjugate images, and each pair of images representing a different perspective view of the stereoscopic scene. In other words, the image engine generates two or more pairs of stereoscopic conjugate images where each pair, when viewed with a suitable viewing apparatus, appears to be a different perspective view of the scene. The image engine is configured to generate a plurality of stereoscopic scenes per second. For example, in one embodiment the image engine generates at least ten stereoscopic scenes per second. In other embodiments, the image engine generates between 2 and 15, or more, stereoscopic scenes per minute. The television may also include a display coupled to the image engine and configured to receive the plurality of stereoscopic scenes and display the plurality of stereoscopic scenes. The television can include a signal generator configured to transmit a perspective view selector that contains identification and synchronization information of the pair of conjugate images to allow a viewing device to show only one perspective view of the at least two pairs of conjugate images.

In various embodiments, the image engine can be configured to generate a first perspective view as seen from a top of said scene and a second perspective view as seen from a front of said scene. The image engine can also be further configured to generate a first perspective view as seen from a right side of said scene and a second perspective view as seen from a left side of said scene.

In other embodiments, a television system for viewing stereoscopic images includes an image engine configured to generate a plurality of stereoscopic scenes, wherein each said scene comprises at least two pairs of stereoscopic conjugate images and each said pair representing a different perspective view of said scene. The image engine can generate at least ten pairs of stereoscopic scenes per a second. A display can be coupled to said image engine and configured to receive the scenes from the image engine and display corresponding said plurality of stereoscopic pairs of images. Such a system could also include a signal generator configured to transmit a perspective view selecting signal that contains identification and synchronization information for said each pair. A viewing device could also be provided, which is configured to receive all or part of the identification and synchronization information and to select to show only one perspective view of said pair of stereoscopic conjugate images through that viewing device. More than one viewing device can be used, each showing a perspective view based on the identification of synchronization data it receives and its location.

The display may include a liquid crystal display panel. Alternatively, the display could include a panel using organic light emitting diodes, a LED display, a plasma display, or another suitable display.

The viewing device can be a pair of glasses with a shuttering mechanism configured to be synchronized with displayed pair of images corresponding to one of the perspective views. The viewing device can be configured to select one of the perspective views based on an angle between a plane of the display and a plane of the viewing device.

In various embodiments, the viewing device includes a receiver configured to receive identification and synchronization information and to select to show a plurality of stereoscopic pairs of images corresponding to only one perspective view among at least two perspective views broadcast by a display, wherein each pair comprises a pair of stereoscopic conjugate images. The viewing device may also include a pair of glasses with a shuttering mechanism configured to be synchronized with said pair of images of one perspective view. The viewing device can be configured to select one of the perspective views based on an angle between a plane of said display on which the plurality of pairs of images are displayed and a plane of the viewing device.

In some embodiments, a television for viewing stereoscopic images of the present invention an image engine configured to generate a plurality of stereoscopic pairs of images. Each of the pair comprises a pair of stereoscopic conjugate images and each of the pair represents a different perspective view of a scene (e.g., different from each other). The image engine may generate at least fifteen pairs of stereoscopic conjugate images per a second for each of the pair. Various embodiments of the invention also includes a display coupled to the image engine and configured to receive the plurality of stereoscopic pairs of images and display the plurality of stereoscopic pairs of images. Embodiments also include a signal generator configured to transmit a perspective view selector that contains identification and synchronization information of the each pair to allow a viewer to view only one pair among the plurality of stereoscopic pairs of images. In some embodiments, the image engine is further configured to generate a first perspective view as seen from a top of the scene and a second perspective view as seen from a front of the scene. The image engine may be further configured to generate a first perspective view as seen from a right side of the scene and a second perspective view as seen from a left side of the scene. The image engine can be further configured to generate a first perspective view as seen from a bottom of the scene and a second perspective view as seen from a front of the scene. The display can be a liquid crystal display panel, or any other type of display such as those displays indicated above.

Various embodiments of the invention may also relate to a television system for viewing stereoscopic images that includes an image engine configured to generate a plurality of stereoscopic pairs of images. Each pair of images includes a pair of stereoscopic conjugate images, and each of the pair of images representing different perspective view of a scene (e.g., a perspective view of the scene different from another pair of conjugate images). The image engine can be configured to generate one or more pairs of stereoscopic conjugate images per second for each scene. For higher quality viewing, the image engine generates five or more, or even ten or more pairs of conjugate images for each scene, per second. In some embodiments, the image engine can be configured to generate fifteen or more pairs of stereoscopic conjugate images per second for each scene. The TV system may also include a display coupled to the image engine and configured to receive the plurality of stereoscopic pairs of images and display the plurality of stereoscopic pairs of images. The TV system may also include a signal generator configured to transmit a perspective view selector signal that contains identification and synchronization information of the each pair of images that can be available for viewing. The signal generator can also be configured to generate the transmitted signal. The TV system may further include one or more viewing devices, each configured to receive the identification and synchronization information and to select to show only one pair among the plurality of stereoscopic pairs of images to a viewer (or user) using the viewing device. In the television system of some embodiments, the image engine is further configured to generate a first perspective view as seen from a top of the scene and a second perspective view as seen from a front of the scene. The image engine can also be configured to generate a first perspective view as seen from a right side of the scene and a second perspective view as seen from a left side of the scene. The image engine may also be further configured to generate a first perspective view as seen from a bottom of the scene and a second perspective view as seen from a front of the scene. In some embodiments, the image engine is configured to generate more than one left perspective views, and or more than one right perspective views, and or more than one top perspective views, and or one or more bottom perspective views, and generate corresponding stereoscopic conjugate image pairs representing each of the generated perspective views.

In some embodiments, the viewing device can be viewing device that attaches to or is connected to a user (for example, head mounted), for example a pair of glasses. The viewing device can include a shuttering mechanism configured to be synchronized with one of the pair of images and each glass of the viewing device configured to show one of the conjugate pair of images of the selected pair. This way, a viewer can chose to watch a movie with the frontal view, the side views, the top views, or the bottom views for the entire movie. Alternatively, the viewer can chose to watch a movie with different perspective views. This is possible because, in various embodiments of the present invention, a viewing device selects one of the pairs based the position of the viewing device relative to the display. For example, in some embodiments the viewing device selects of the pairs of images based on an angle between a plane of the display and a plane of the viewing device.

In embodiments of the present invention, a viewing device may include a receiver configured to receive identification and synchronization information and to select to show only one pair among a plurality of stereoscopic pairs of images, based on the received information Each of the pair comprises a pair of stereoscopic conjugate images and each of the pair representing different perspective view of a scene from each other. The viewing device may also include a pair of glasses with a shuttering mechanism configured to be synchronized with one of the pair of images and each glass of the viewing device configured to show one of the conjugate pair of images of the selected pair. The viewing device selects one of the pairs based on an angle between a plane of a display on which the plurality of pairs of images are displayed and a plane of the viewing device.

Methods of viewing three dimensional images are also described. In some embodiments, the method includes gathering viewer state information based on positional information of the viewer location relative to the broadcast source and viewer orientation relative to the vertical and horizontal axis of the broadcast source, receiving video content (e.g., a composite 3D signal), and generating a plurality of left and right pairs of stereo images for a video scene. Generating the plurality of left and right pairs of stereo images can be based on the positional information provided. The method can further include projecting the generated stereo images on a display. The method can also include assigning each stereo image pair (e.g., left image, right image) to an individual frequency consistent with a viewing device receiver state, and broadcasting a signal in the area of the display. The combined signal method is broadcasted to an area around display device. The broadcast signal can contain identification and synchronization information of at least two pairs of stereoscopic conjugate images of each scene to allow a viewing device that receives the signal to select a plurality of only one pair of stereoscopic conjugate images representing one perspective view of said each stereoscopic scene. In one method, the viewing device can receive broadcast information (e.g., identification and synchronization information of pairs of stereoscopic conjugate images of each scene), select a plurality of only one pair of stereoscopic conjugate images representing one perspective view of said each stereoscopic scene, and shutter a left eye viewer and a right eye viewer of the display device based on the received information, such that the shuttering corresponds with the display of stereoscopic image pairs representing one perspective view, wherein the perspective view is based on the location of the viewing device relative to the display. In some embodiments, each viewers viewing device receives the signal and determines (e.g., independently) the correct image pair to be seen by that viewing device in the left eye viewer and right eye viewer, by way of shuttering the left eye viewer and the right eye viewer, accordingly based on the synchronized frequency assignment.

BRIEF DESCRIPTION OF THE DRAWINGS

FIG. 1 illustrates three different regions for three possible positions, the present invention contemplates two or more different positions and is not just limited to three regions.

FIG. 2 shows three different regions for three possible positions, the present invention contemplates two or more different positions and not just limited to three regions. In addition to a viewer being allowed to watch a movie with different perspectives by located in different regions with respect to the display device, in some embodiments of the present invention a view is allowed to view a different set of stereoscopic scenes by simply tilting the head.

DETAILED DESCRIPTION OF CERTAIN EMBODIMENTS

Figure 1:
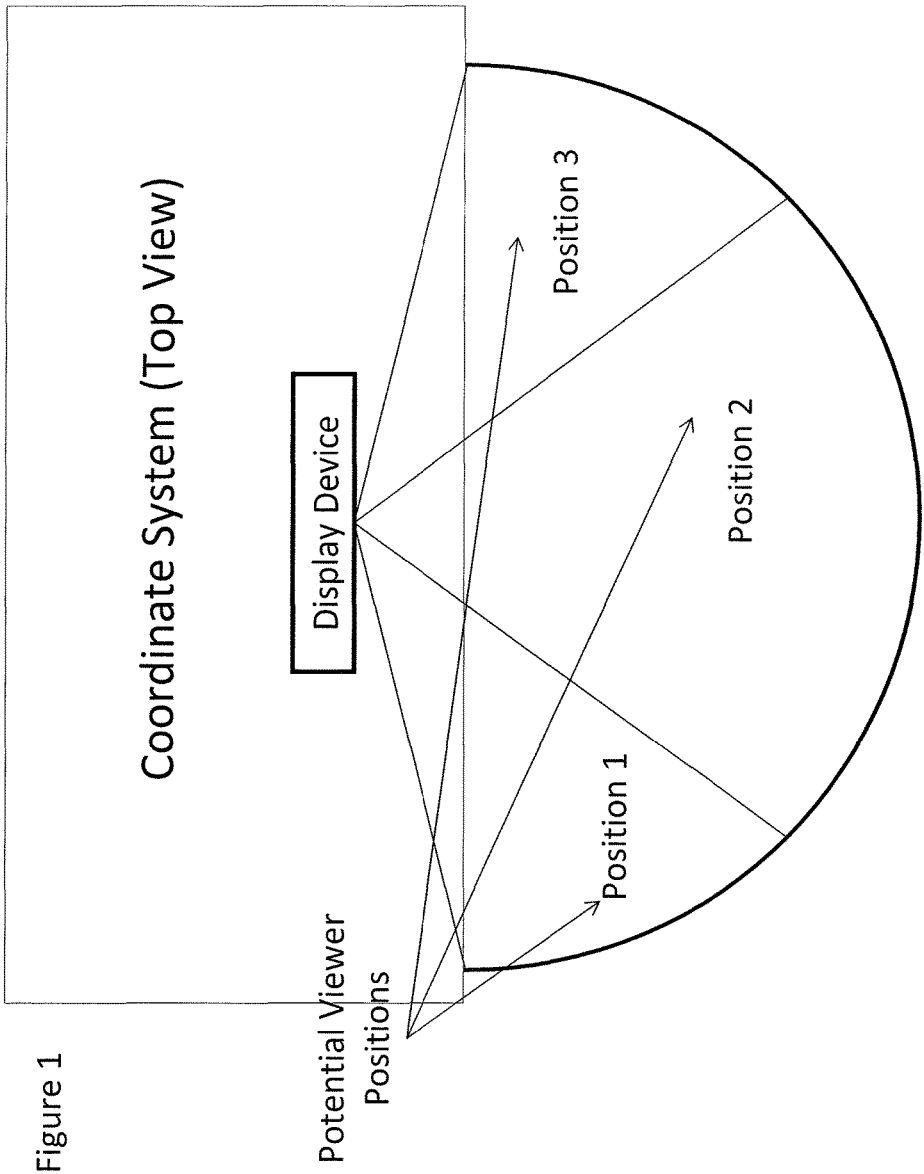
FIG. 1 is an illustration of three possible different side-to-side locations for viewing different stereoscopic images. A viewer located in position 1 would watch a movie with the left side of the movie scenes. Here, the left side refers to a relative direction with regard to the viewer's point of view. A viewer located in position 2 would watch a movie with the front side of the movie scenes. A viewer located in position 3 would watch a movie with the right side of the movie scenes. Although

In the context of this invention, it is useful to specify a coordinate system that defines some of the characteristics of the invention. In FIG. 1, a viewing scenario is defined that specifies several viewing positions possible for a display device such as TV. The viewing angles are all defined on a horizontal axis parallel to the ground. A simplified example of this scenario includes multiple people watching a television show at the same time but, from different viewing angles. FIG. 1 illustrates positions 1-3 having different viewing angles of the display device. However, it is contemplated that there can be more, or less, than three positions of viewing the display device as defined in the top view.

Figure 2:
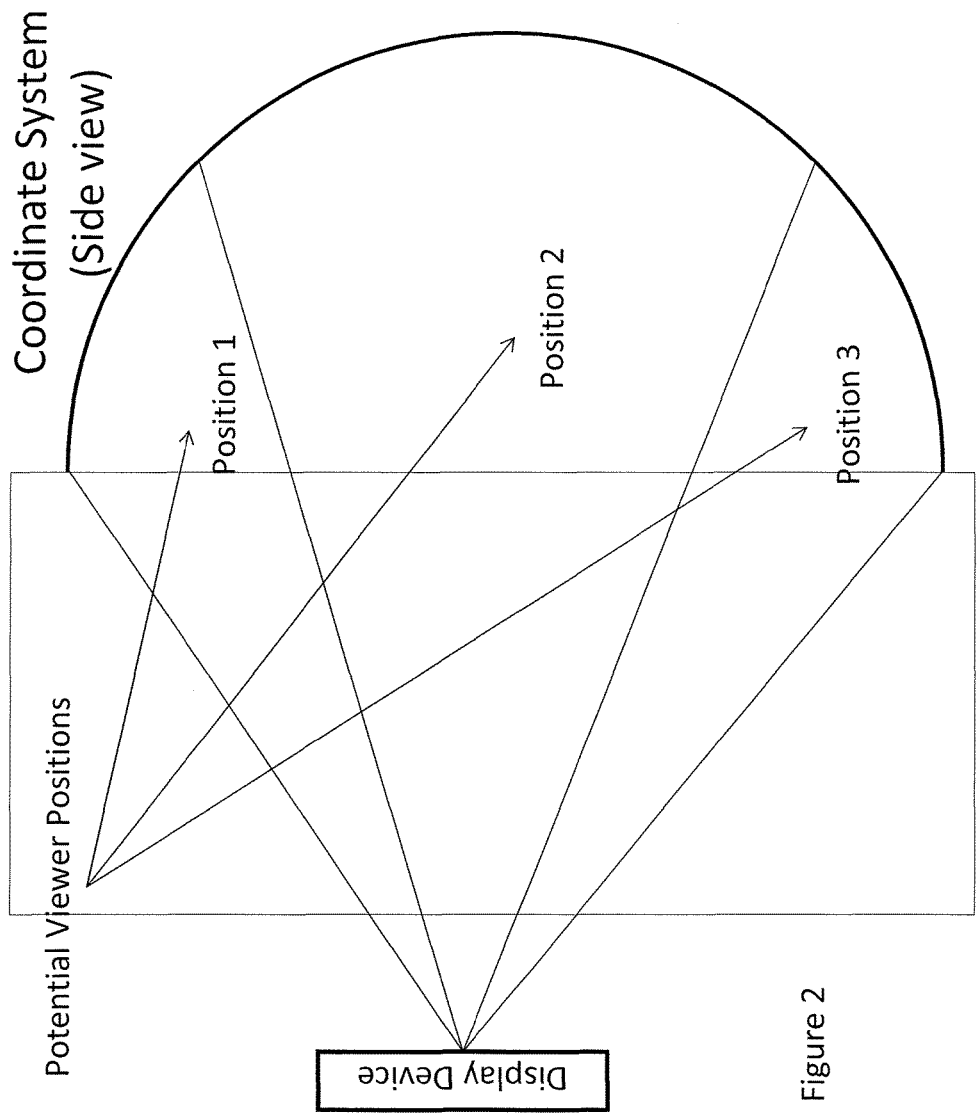
FIG. 2 is an illustration of three possible different top-to-bottom locations for viewing different stereoscopic images. A viewer located in position 1 would watch a movie with the top side of the movie scenes. A viewer located in position 2 would watch a movie with the front side of the movie scenes. A viewer located in position 3 would watch a movie with the bottom side of the movie scenes. Although

As shown in FIG. 2, a viewing scenario is defined that specifies additional possible viewing positions; however, these are defined on a vertical axis perpendicular to the ground. A simplified example of this scenario includes multiple people watching from variable height seating or as a function of individual height differentials. FIG. 2 illustrates also positions 1-3 having different viewing angles of the display device. However, it is contemplated that there can be more, or less, than three positions of viewing the display device as defined in the side view. The viewing angles described in reference to FIGS. 1 and 2, when combined, create a large combination of possible viewing areas.

Figure 3:
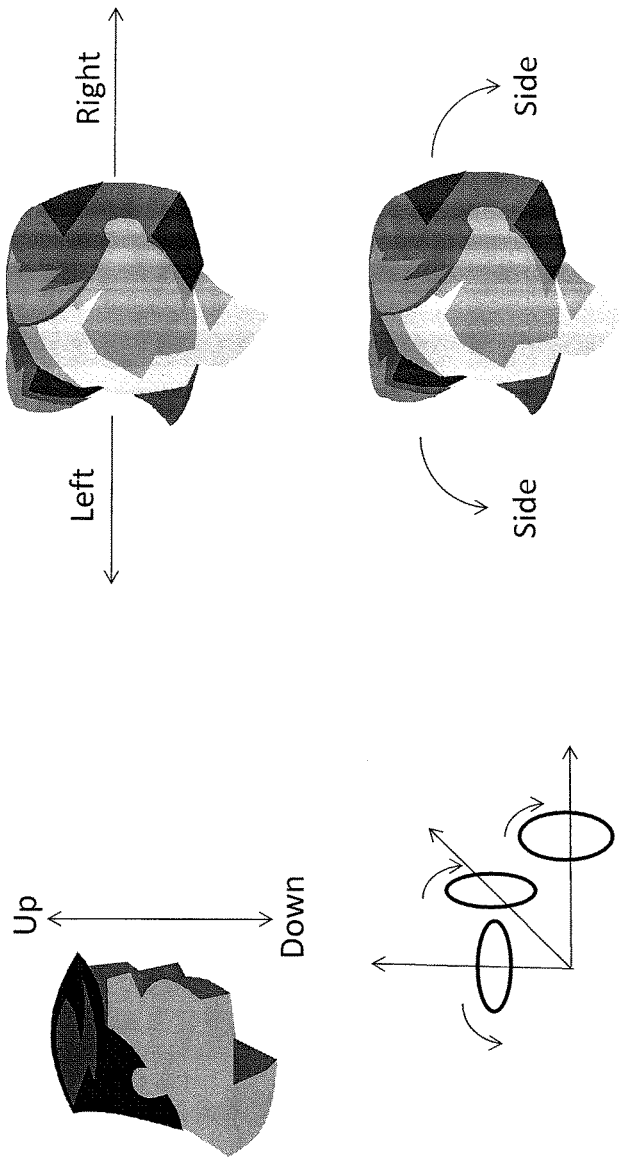
FIG. 3 is an illustration of a view moving his/her head to select a particular set of stereoscopic scenes. For instance, by tilting the head to the right, the viewer would be watching the movie with the right side of the movie scenes. By tilting the head to the left, the viewer would be watching the movie with the left side of the movie scenes. By keeping the head to straight, the viewer would be watching the movie with the frontal views of the movie scenes. By tilting the head up, the viewer would be watching the movie with the lower side of the movie scenes. By tilting the head low, the viewer would be watching the movie with the top side of the movie scenes.

As shown in FIG. 3, the viewer to television plane angle has an additional and/or alternative 3 degrees of freedom that produces a large number of potential viewer-to-television geometric relationships. In order to determine the 3 degrees of freedom, one shutter glasses implementation approach incorporates a Micro-Electro-Mechanical Systems (MEMS) gyroscope. MEMS is the integration of mechanical elements, sensors, actuators, and electronics on a common silicon substrate through micro fabrication technology. The MEMS gyroscope is currently used in the Nintendo Wii controller and to be introduced into next generation cellular telephones (see "Next-gen iPhone to sport MEMS gyroscope?", MacWorld, MacWorld Staff). The MEMS gyroscope is also documented in U.S. Pat. No. 6,715,353, "MEMS Gyroscope with Parametric Gain." Also, U.S. Pat. No. 7,219,033, "Single/multiple axes six degrees of freedom (6 DOF) inertial motion capture system with initial orientation determination capability", describes an entire system to capture both angular orientation via a MEMS gyroscope but, also relative linear translation in the x, y, z plan using a combination of inertial MEM accelerometers and magnetometers. In order to determine the linear and angular relationship between the television and the shutter glasses, one shutter glasses example implementation uses IR sensors attached on the left and right of the television to measure the distance to the shutter glasses. As with Nintendo Wii sensor bar and controller configuration (see "How Does a Nintendo Wii Sensor Work?", Matthew Williams, eHow, 2007), the IR emitters transmit two infrared beams that are picked up by the shutter glasses to gain the positional relationship of the shutter glasses relative to the IR beams. With pre-configured knowledge of the IR emitter locations, the information is then processed either on the shutter glasses or back at the television to determine the absolute position of the shutter glasses with respect to the television. Given the angular position using the shutter glasses and the angular position with shutter glasses with respect to the television, the viewer perspective is determined directly. Under some embodiments, the perspective information from multiple shutter glasses can be passed to the Image Engine and used to generate the viewed stereoscopic images.

Figure 4:
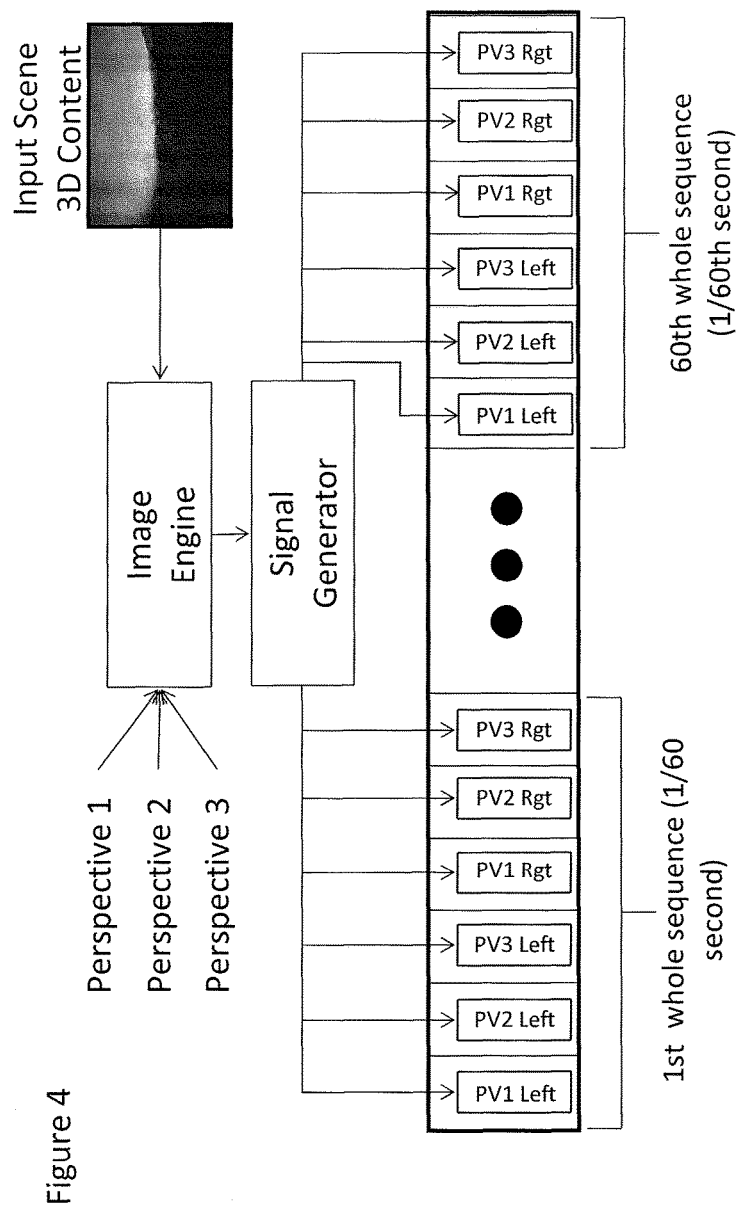
FIG. 4 is a part block diagram and a part schematic illustrating various functional blocks in generating three different perspective views.

The invention includes an Image Engine, Signal Sync Processor, Signal Generator, and Display Component. The Image Engine ingests 3D content in either formatted content or solid model representations. The Image Engine generates a set of stereoscopic views based on the 3D contents and desired viewer perspective. Each individual view contains a stereo image (both a left and right eye image) at an assigned perspective. The Signal Generator defines and places an individual image in the viewing stream based on Signal Sync Processor inputs. The Signal Sync Processor defines the number of required perspectives and optionally synchronizes the refresh rate with the shutter glasses through an optional Glasses Interface. As shown in FIG. 4, the Signal Generator sequences the left and right images into the output stream based on the image perspectives provided by the Image Engine. The Display Component ingests the sequenced output stream from the Signal Generator to create a viewable series of images.

The Image Engine component ingests 3D content and provides perspective stereoscopic views based on perspective information provided by the shutter glasses. The Image Engine ingests static scenes (as captured with multiple fixed cameras), dynamic scenes (as captured with multiple dynamic cameras), or from fully developed scene geometry to include 3D model of all scene objects. As shown in "Multi-View Imaging and 3DTV", Akira Kubota, et al., Jul. 27, 2007, the content is transformed from a raw format into a right and left view for the viewer's perspective using potentially three different methods. First, the captured stereoscopic scene is presented to the viewer because the perspective presented matches or is within a margin (e.g., about 10%) of the viewer's perspective. Second, the captured stereoscopic view can be interpolated from multiple cameras. Certain examples interpolation schemes are developed in "View Synthesis for Multi-View Auto-Stereoscopic Displays", R. Khoshabeh, et al., ICAP, 2010 and "Reconstructing Human Shape, Motion and Appearance from Multi-view Video", Christian Theobalt, et al., Three-Dimensional Television, 2008, and also disclosed in U.S. Pat. No. 7,652,665. Third, the stereoscopic view is presented to the viewer with the viewer's perspective based on a rendered image using the fully developed scene geometry as demonstrated in U.S. Pat. No. 6,954,202, and in "View-Dependent Geometry", Paul Rademacher, Computer Graphics Proceedings, 1999. The 3D content could be delivered through standard cable connection, an Internet connection, or through playback from digital data device (e.g. solid state recorder, DVD, BVD) using standards being developed by the Moving Picture Experts Group (MPEG) to handle multi-view video coding under the MPEG-4 3D Audio/Visual standard. Moreover, the Image Engine addresses multiple viewer redundancies and luminance issues. If the Image Engine determines that the perspective views of two or more viewer is near identical, only one view is generated for the multiple views. If the Image Engine determines that there are multiple perspective views, the brightness for each stereoscopic view is increased step-wise to compensate for brightness loss at the viewer. For example, if three distinct perspectives are rendered, the brightness per rendered image can be increased by a factor of three. The Image Engine provides the Signal Synchronizer with all the view assignments and rendered images as 3D content is processed.

The Signal Synchronizer component generates the timing information for the entire system. As shown in FIG. 4, various of embodiments of present invention preferably create images for each necessary perspective for the left and right eye at a minimum refresh rate in a page flipped fashion. The presentation preferably is timed to correspond with the correct viewer and the correct eye. The Signal Synchronizer provides timing direction to the Signal Generator in all cases. In some embodiments of the invention, the Signal Synchronizer receives direction from the 3D shutter glasses. In some embodiments of the invention, the Signal Synchronizer provides directions to the 3D shutter glasses. In one particular embodiment of the invention, an internal clock within the glasses is used as the reference signal for the shutter glasses. Given a channel to communicate between the shutter glasses and the 3D television, the internal clock is programmable to match the television viewing frequency. If no communication channel exists, the internal clock is allowed to run at the refresh rate of the television. The shutter glasses are then tuned to the internal clock using a sync signal or to a pre-configured sync signal unique to each pair of shutter glasses. An example sync signal is composed of the following components (32 bits total):

1. 2 bits: directive id (start)
2. 4 bits: shutter glasses id
3. 8 bits: clock cycle for $1^{st}$ viewed image in left eye.
4. 8 bits: clock cycle for $1^{st}$ viewed image in right eye 5. 8 bits: assigned wait interval, number of intervals between switching 6. 2 bits: directive id (end)

Once the shutter glasses receive the sync message through a Bluetooth or similar connection from, the message is decoded and the shutter glasses respond to the directive to synchronize left and right eye viewing to the internal clock. One example of software code for the shutter glasses decoding and synchronization is shown below:

```
/* Headers */
#include <stdio.h>
#include <"shutter3Dglasses.h">
/* Coded message at 32 bits. */
    unsigned int directive;
    int main(int argc, char **argv) {
        /* Decode the sync message */
        fscanf(stdin, "%d", &directive);
        unsigned char directiveID = (unsigned char) directive >> 30;
        /* Test whether the directive is a shutter sync directive. */
        if (directiveID != GLASSES_SYNC) return (-1)
        /* Decode the sync message */
        unsigned char glassesID = (unsigned char) ((directive >> 26) & 15);
        /* Test whether the current hardware is the intended receiver. */
        if (id != getGlassesID( )) return(-1);
        /* Restart the internal clock( ) - provides sync to television component. */
        /* Shutter glasses wait for an IR message from television to sync. */
        If (!restartInternalClock( )) return (-1);
        /* Decode the left, right, interval sync values and verify compliance */
        unsigned char leftSyncStart = (unsigned char) ((directive >> 18) & 255);
        unsigned char rightSyncStart = (unsigned char)((directive >> 10) & 255);
        unsigned char intervalSync = (unsigned char)((directive >> 2) & 255);
        if (leftSyncStart <= 0) return (-1);
        if (rightSyncStart <= 0) return (-1);
        if (intervalSync <= 0) return (-1);
        /* Verify message validity. */
        unsigned char endID = (unsigned char)((directive & 3);
            if (endID != directiveID) return(-1);
        /* Determine the currently closed eye (left = 1, right = -1) - current closed eye
*/
        /* will be opened on the starting sync.
        if (getGlassesClosedState( ) > 0) {
            /* Set the sync for the left eye. */
            char loopStop = 0;
            do {
                /* Once the correct cycle is reached, a shutter sync thread is created
                if (getInternalClockCycle( ) == leftSyncStart) {
                    startShutterGlasses(intervalSync);
                    loopStop = 1;
                }
            } while (loopStop == 0);
        } else if (getGlassesClosedState( ) < 0) {
            /* Set the sync for the right eye. */
            char loopStop = 0;
            do {
                /* Once the correct cycle is reached, a shutter sync thread is created
                if (getInternalClockCycle( ) == rightSyncStart) {
                    startShutterGlasses(intervalSync);
                    loopStop = 1;
                }
            } while (loopStop == 0);
        } else {
            return (-1);
        }
        return(0);
    }
```

This example software first decodes the 32 bit directive to validate the direction to sync the glasses with the internal sync. Next, the software decodes a shutter glasses identifier to ensure the message was directed to this particular set of glasses. Given that the television is requesting a sync on this particular pair of shutter glasses, the system waits for a cue, such as an IR signal, to start a configured internal clock. Once the internal clock is started, the directive is decoded to include the left eye start cycle, right eye start cycle, and number of intervals between switching. The hardware determines which eye is currently open or close and switching begins on the eye currently closed. Once the internal clock cycle and prescribed sync cycle are equal, left and right switching begins on the prescribed interval. The sync signal may optionally transmit on a regular basis (e.g., every 10 seconds) to ensure the viewer continues to maintain glasses synchronization with the television. The above implementation provides some level of independence between the shutter glasses and the controlling component (e.g. television).

Additionally, there are other ways to control the shuttering rate of the glasses. A common way connects the shutter glasses to a controller either through a wireless connection (e.g., Bluetooth, IR, or radio link) and directly controls the shutter rate such as the Nvidia 3D Vision Kit that includes liquid crystal shutter glasses and a IR emitter controller. Within this invention, the Signal Synchronizer would drive the IR emitter by communicating to multiple shutter glasses at the television's frame rate. Each set of glasses would have to decode each sync message, determine the intent, determine the intended receiver, and shutter to the alternate eye. An example sync signal is composed of the following components (8 bits total):

2 bits: directive id (start) 4 bits: shutter glasses id 2 bits: shutter request (0=none, 1=left eye. 2=right eye, 3=both)

Once the shutter glasses receive the sync message through the IR or similar connection, the message is decoded and the shutter glasses respond to the directive to shutter. One example of software code for the shutter glasses decoding and shuttering is shown below:

```
/* Headers */
#include <stdio.h>
#include <"shutter3Dglasses.h">
/* Coded message at 32 bits. */
    unsigned char directive;
    int main(int argc, char **argv) {
        /* Decode the sync message */
        fscanf(stdin, "%c", &directive);
        unsigned char directiveID = (unsigned char) directive >> 6;
        /* Test whether the directive is a shutter sync directive.
*/
        if (directiveID != GLASSES_SHUTTER) return (-1)
    /* Decode the sync message */
        unsigned char glassesID = (unsigned char) ((directive >> 2) & 15);
        /* Test whether the current hardware is the intended receiver. */
    if (id != getGlassesID( )) return(-1);
            /* Decode the left, right, interval sync values and verify compliance */
        unsigned char shutterID = (unsigned char) (directive & 3);
    start ShutterGlasses(shutterID);
        return(0);
    }
```

A common hardware implementation for shuttered glasses is liquid crystal glasses. The liquid crystal shutter elements are driven by AC voltages where the driving signals are typically around 3-8V and frequency is usually 100 to 120 Hz. The shutter elements are usually designed such that when no voltage is connected to them you can see through them and when you apply the AC control voltage those elements become black. Example glasses for this implementation are the XpanD 3D LC glasses and the Samsung SSG-2100AB glasses.

The Signal Generator interfaces with the Signal Synchronizer and the Image Engine to produce a continuous stream of data. The Signal Synchronizer provides the assigned frequency while the Image Engine provides the assigned images to the Signal Generator. As shown in FIG. 4, in some embodiments the Signal Generator creates the continuous video stream that matches the shuttering constraints at the shutter glasses.

A hardware implementation of the current invention may require efficient use of memory and external communication between external components namely the shutter glasses. To implement the Image Engine and Signal Generator, modern graphics processing units (GPUs) are used to perform all the 3D calculations and video stream encoding. An example processor includes the Tesla GPU based on the NVIDIA® CUDA™ massively parallel computing architecture. To implement the Signal Synchronizer and Glasses Interface, a general purpose-low power processor such as the Qualcomm® Snapdragon™ using a modified ARM instruction set satisfies the need for external communication and simple processing. The display component can be an LCD television with an LED backlight configuration (an example of which is described in the U.S. Pat. No. 7,333,165, which is incorporated herein by reference in its entirety) where available refresh rates approach 480 Hz.

Figure 5:
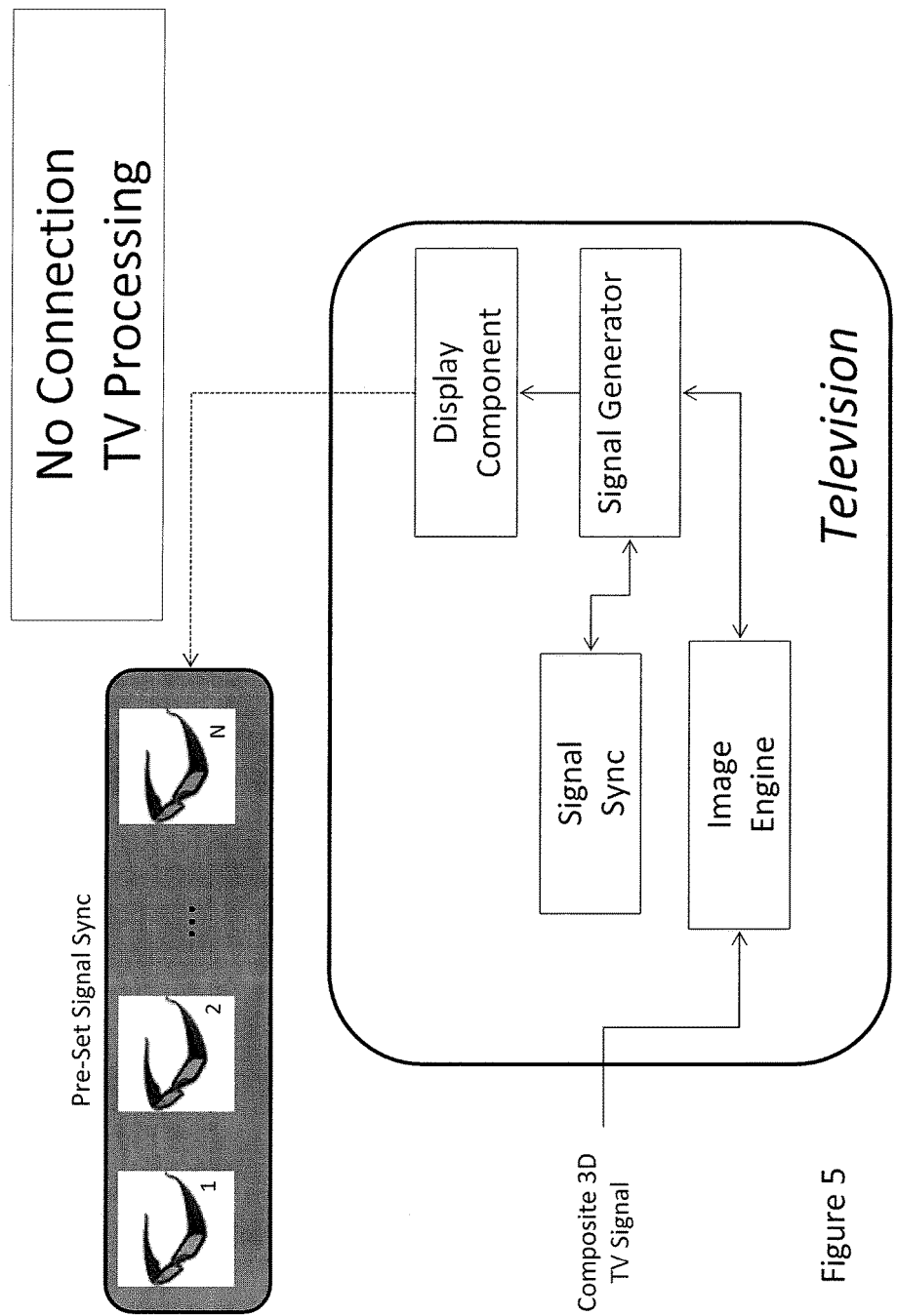
FIG. 5 is a part block diagram and a part schematic illustrating various functional blocks that perform multi-viewer presentation through a television display with no active connection between the external shutter glasses and the television unit.
Figure 6:
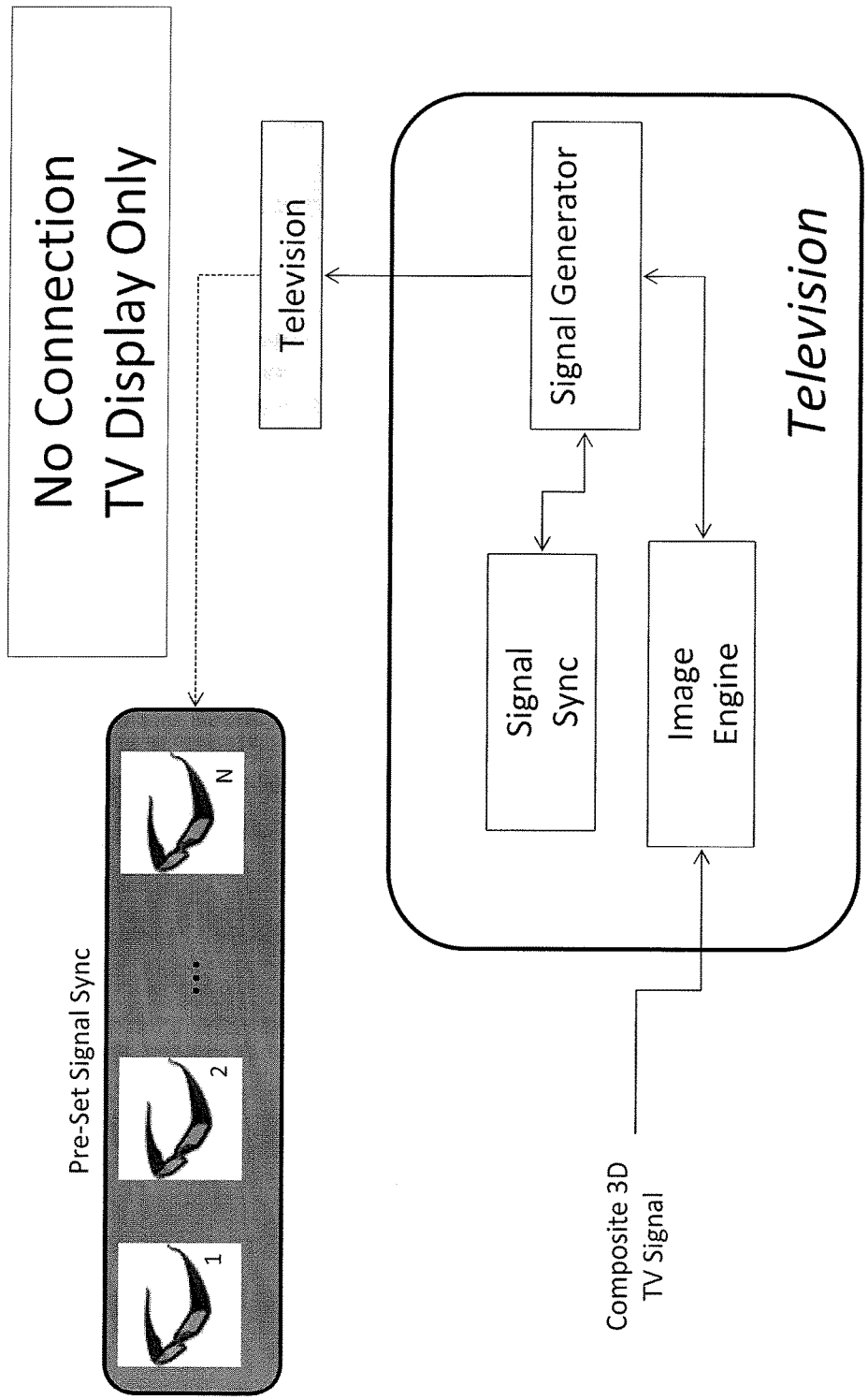
FIG. 6 is a part block diagram and a part schematic illustrating various functional blocks that perform multi-viewer presentation through a television display with no active connection between the external shutter glasses and an external unit where the external unit outputs to a separate television unit.

In some embodiments, the invention has no established connection between the television to shutter glasses as shown in FIGS. 5 and 6. In FIG. 5, the 3D content is ingested into the Image Engine to create multiple 3D stereoscopic perspective views. In this embodiment, the views are pre-defined or pre-configured to a set maximum number. The Signal Sync Processor defines the maximum number and shutter configuration information. The Signal Generator determines the number of views to be generated and passes the information to the Image Engine. The Image Engine returns the set image views to the Signal Generator based on pre-defined perspective view geometries. The Signal Generator sequences the images based on the pre-defined shutter information passed from the Signal Sync Processor. The image sequence is passed from the Signal Generator to the Display Component for viewing. Because the individual glasses are tuned to set to a pre-defined refresh rate defined in the Signal Sync Processor, the viewer sees a continuous video (or multiple images for both left and right eyes) in stereo. The glasses can be configured to operate to display the video such that all viewers to tune into the same refresh rate and thus see the same exact video. The glasses can also be configured to display video such that all viewers can tune into different refresh rates to see multiple views of the same 3D content. An additional embodiment of the invention is shown in FIG. 6 where the actual display components are a separated device from the rest of the system. In this scenario, the television is separate from the main system (e.g., Signal Sync, Image Engine, and Signal Generator) where examples may include a DVD player system, a DVR system, a game console system, a cable box system, or a stand-alone system.

Figure 7:
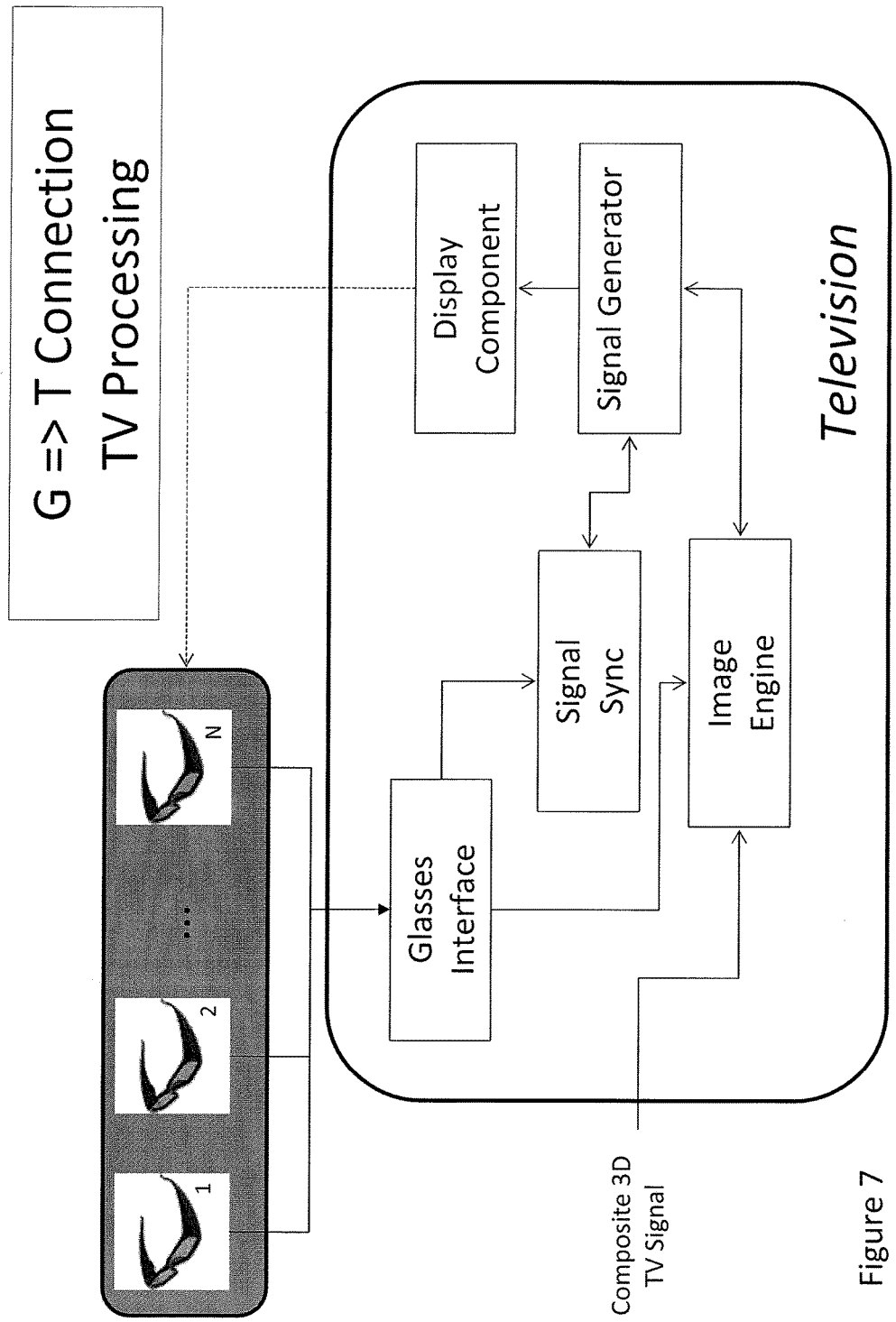
FIG. 7 is a part block diagram and a part schematic illustrating various functional blocks that perform multi-viewer presentation through a television display with a one way connection from the external shutter glasses to the television unit.
Figure 8:
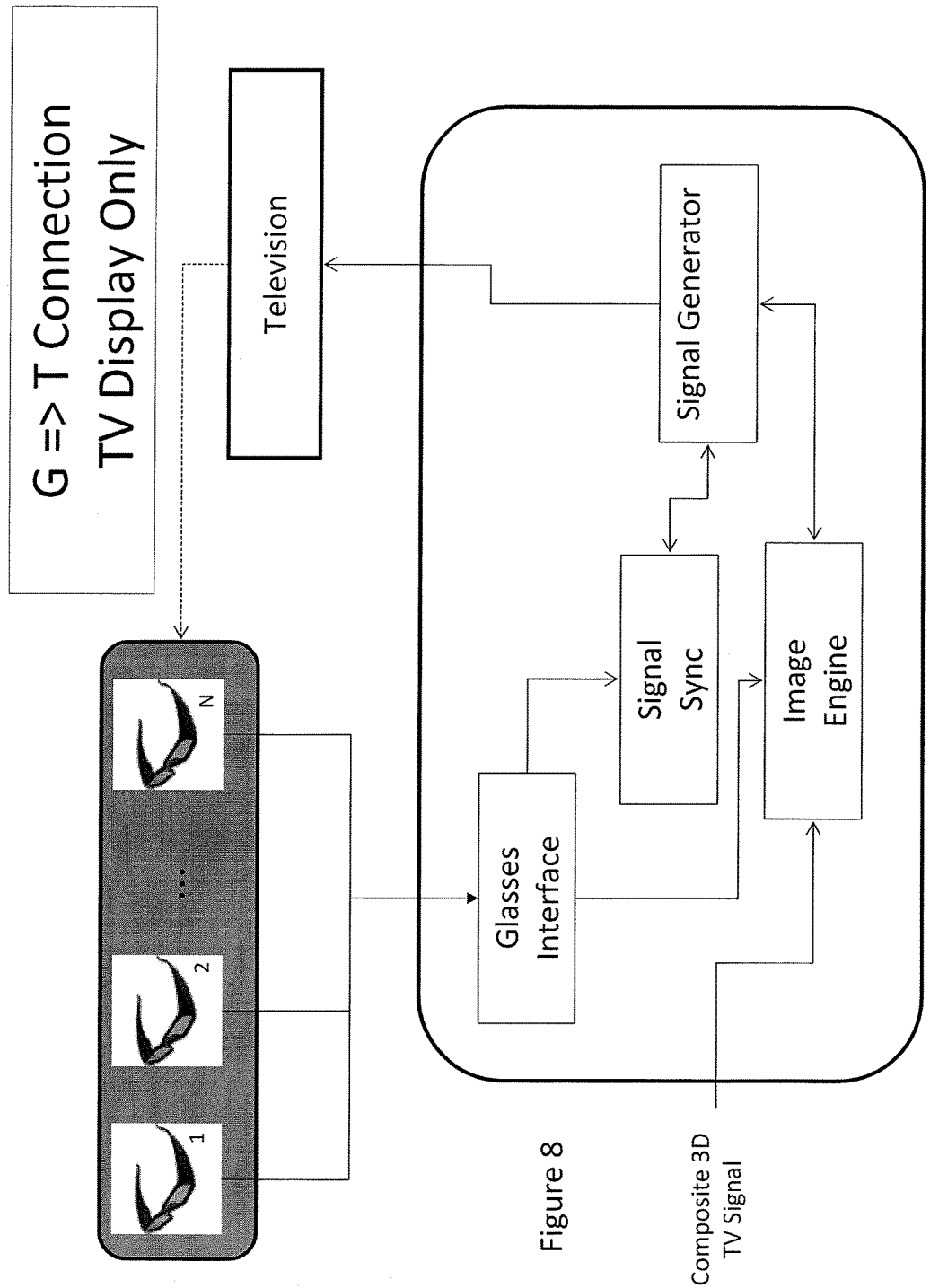
FIG. 8 is a part block diagram and a part schematic illustrating various functional blocks that perform multi-viewer presentation through a television display with a one way connection from the external shutter glasses to an external unit where the external unit outputs to a separate television unit.

In some embodiments, the system has an established one-way connection between the shutter glasses and the television as shown in FIGS. 7 and 8. In FIG. 7, the 3D content is ingested into the Image Engine to create multiple 3D stereoscopic perspective views. In this embodiment, the shutter glasses transmit a perspective view to include up/down angle, side-to-side angle, and left-to-right angle plus distance to the viewing plane. Additionally, the glasses provide a set frequency that the glasses will be shuttered against. The glasses provide this information to a Glasses Interface that decodes the information and passes the perspective information to the Image Engine and passes the shuttering information to the Signal Synch Processor. The Signal Sync Processor communicates the shutter information to the Signal Generator which includes the number of glasses currently viewing, the pre-determined shutter speeds, and the pre-determined base shutter frequency. The Signal Generator determines the number of views to be generated and passes the information to the Image Engine. The Image Engine returns the set image views to the Signal Generator based on the perspective view geometries provided by the Glasses Interface. The Signal Generator sequences the images based on the shutter information passed from the Signal Sync Processor. The image sequence is passed from the Signal Generator to the Display Component for viewing. An additional embodiment of the invention is shown in FIG. 8 where the actual display components are a separated device from the rest of the system. In this scenario, the television is separate from the main system (e.g., Glasses Interface, Signal Sync, Image Engine, and Signal Generator) where examples may include a DVD player system, a DVR system, a game console system, a cable box system, or a stand-alone system.

Figure 9:
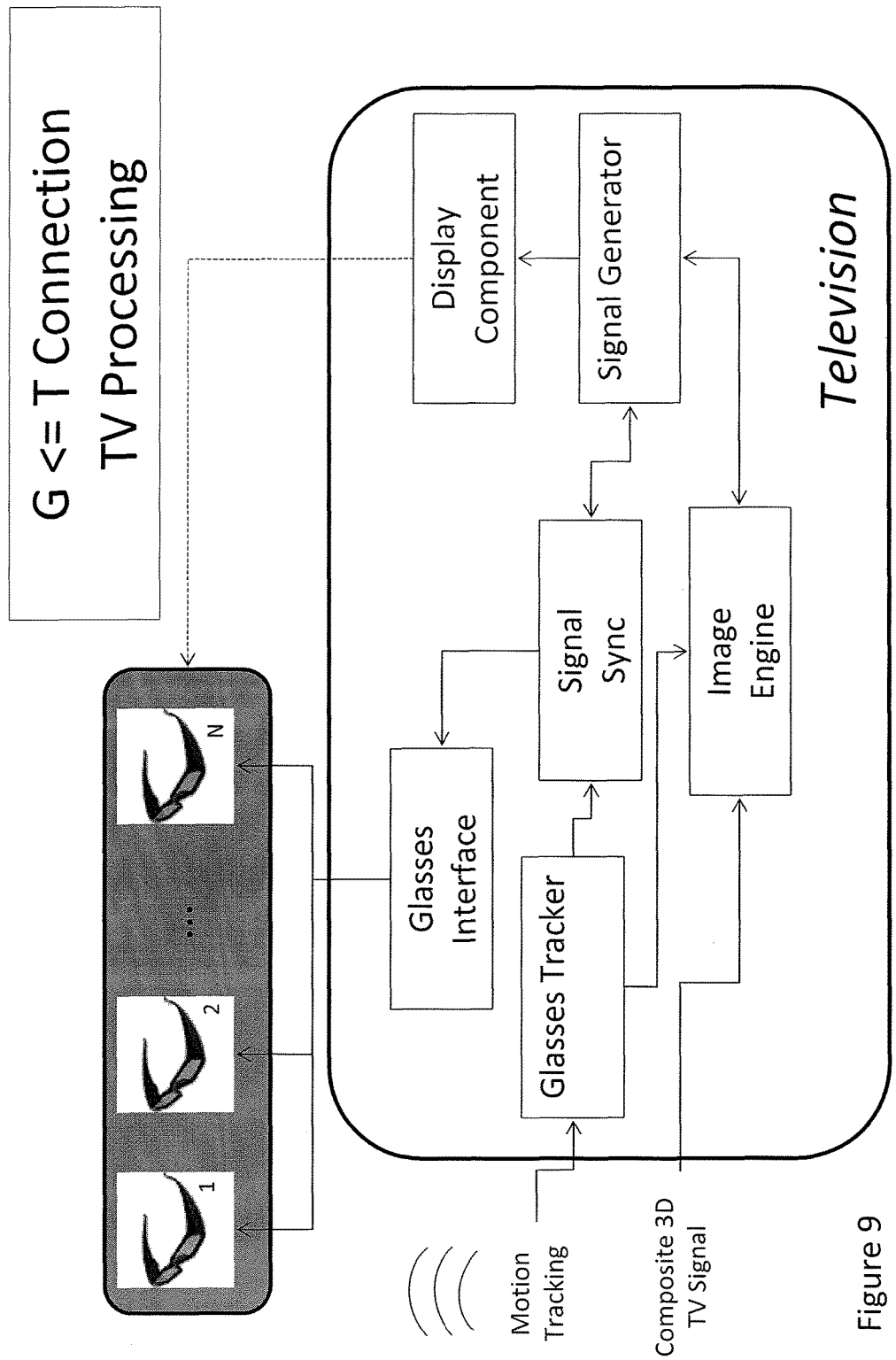
FIG. 9 is a part block diagram and a part schematic illustrating various functional blocks that perform multi-viewer presentation through a television display with a one way connection from the television unit to the external shutter glasses.
Figure 10:
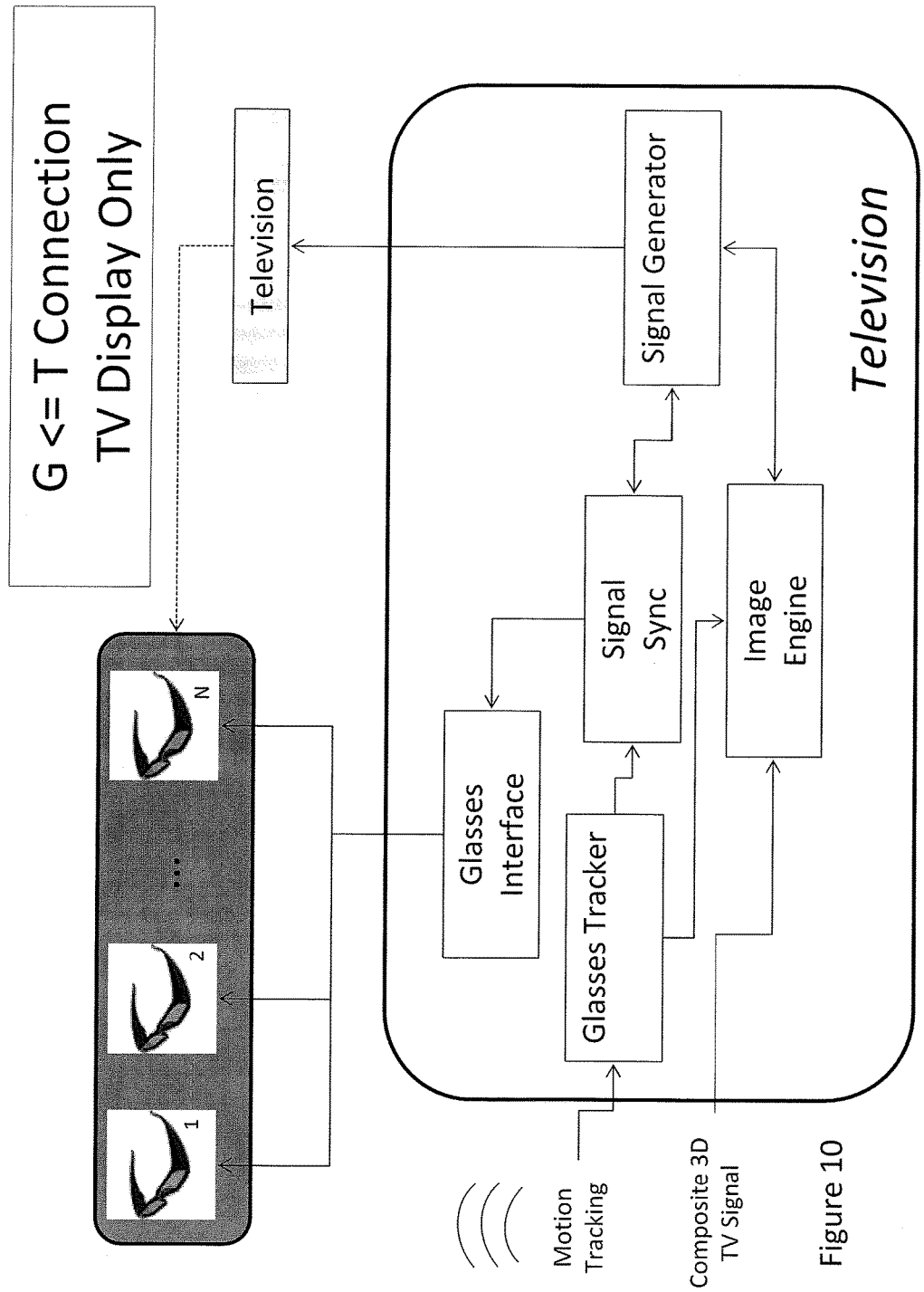
FIG. 10 is a part block diagram and a part schematic illustrating various functional blocks that perform multi-viewer presentation through a television display with a one way connection from an external unit to the shutter glasses where the external unit outputs to a separate television unit.

In some embodiments, the invention has an established one-way connection between the television and the shutter glasses FIGS. 9 and 10. In FIG. 9, the 3D content is ingested into the Image Engine to create multiple 3D stereoscopic perspective views. In this embodiment, the television includes a Glasses Tracker that performs motion tracking to determine the angular position and distance from the viewing surface for multiple glasses. The Glasses Tracker transmits a perspective view to include up/down angle, side-to-side angle, and left-to-right angle plus distance to the viewing plane to the Image Engine. The Glasses Tracker also transmits the number of viewing glasses to the Signal Sync Processor. The Signal Sync Processor communicates the necessary shutter information to the Glasses Interface for all available viewing glasses. The Glasses Interface transmits the shutter information to include shutter speed and base shutter frequency to the respective glasses. The Signal Sync Processor passes the shuttering information and number of viewer to the Signal Generator as well. The Signal Generator determines the number of views to be generated and passes the information to the Image Engine. The Image Engine returns the set image views to the Signal Generator based on the perspective view geometries provided by the Glasses Tracker. The Signal Generator sequences the images based on the shutter information passed from the Signal Sync Processor. The image sequence is passed from the Signal Generator to the Display Component for viewing.

An additional embodiment of the invention is shown in FIG. 10 where the actual display components are a separated device from the rest of the system. In this scenario, the television is separate from the main system (e.g., Glasses Interface, Signal Sync, Image Engine, and Signal Generator) where examples may include a DVD player system, a DVR system, a game console system, a cable box system, or a stand-alone system.

Figure 11:
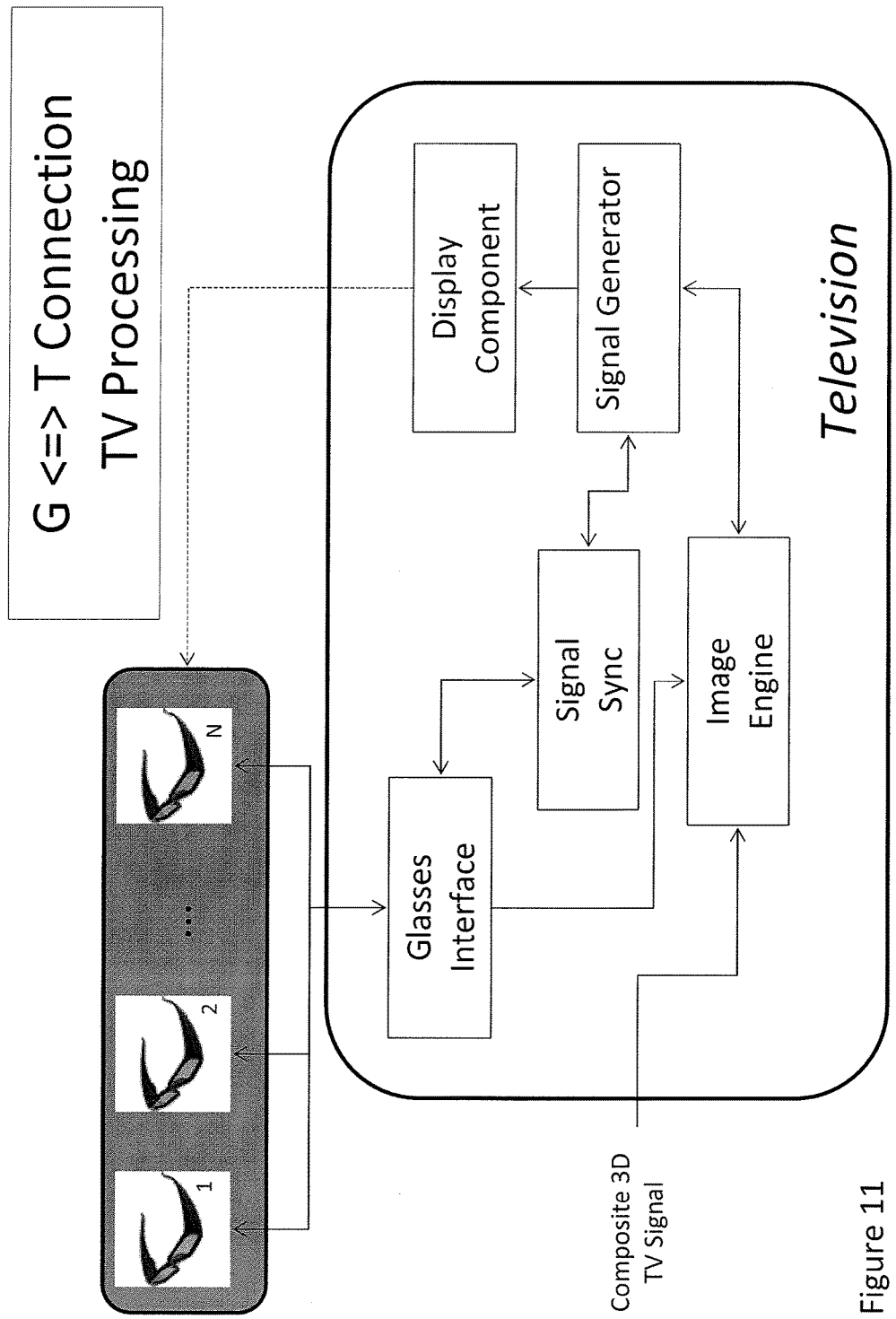
FIG. 11 is a part block diagram and a part schematic illustrating various functional blocks that perform multi-viewer presentation through a television display with a two way connection from the external shutter glasses to the television unit and back.
Figure 12:
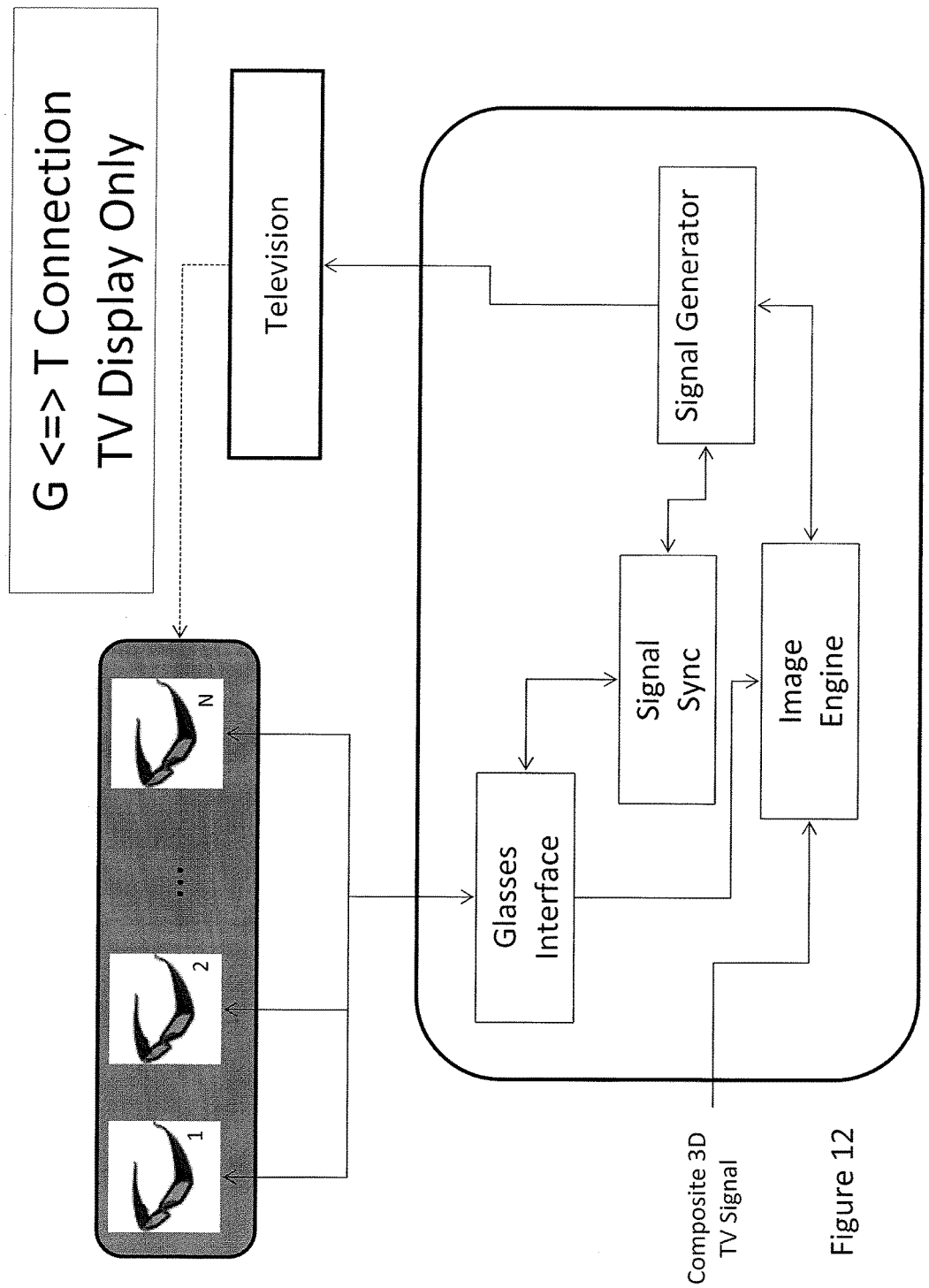
FIG. 12 is a part block diagram and a part schematic illustrating various functional blocks that perform multi-viewer presentation through a television display with a two way connection from the external shutter glasses to an external unit and back where the external unit outputs to a separate television unit.

In some embodiments, the invention has an established two-way connection between the shutter glasses and the television as shown in FIGS. 11 and 12. In FIG. 11, the 3D content is ingested into the Image Engine to create multiple 3D stereoscopic perspective views. In this embodiment, the shutter glasses transmit a perspective view to include up/down angle, side-to-side angle, and left-to-right angle plus distance to the viewing plane. The glasses provide this information to a Glasses Interface that decodes the information and passes the perspective information to the Image Engine. The Signal Sync Processor provides the shutter information to be utilized by all viewing glasses to the Glasses Interface. The Glasses Interface transmits the shutter information to include shutter speed and base shutter frequency to the respective glasses. The Signal Sync Processor communicates the shutter information to the Signal Generator which includes the number of glasses currently viewing, the pre-determined shutter speeds, and the pre-determined base shutter frequency. The Signal Generator determines the number of views to be generated and passes the information to the Image Engine. The Image Engine returns the set image views to the Signal Generator based on the perspective view geometries provided by the Glasses Interface. The Signal Generator sequences the images based on the shutter information passed from the Signal Sync Processor. The image sequence is passed from the Signal Generator to the Display Component for viewing. An additional embodiment of the invention is shown in FIG. 10 where the actual display components are a separated device from the rest of the system. In this scenario, the television is separate from the main system (e.g., Glasses Interface, Signal Sync, Image Engine, and Signal Generator) where examples may include a DVD player system, a DVR system, a game console system, a cable box system, or a stand-alone system.

Figure 13:
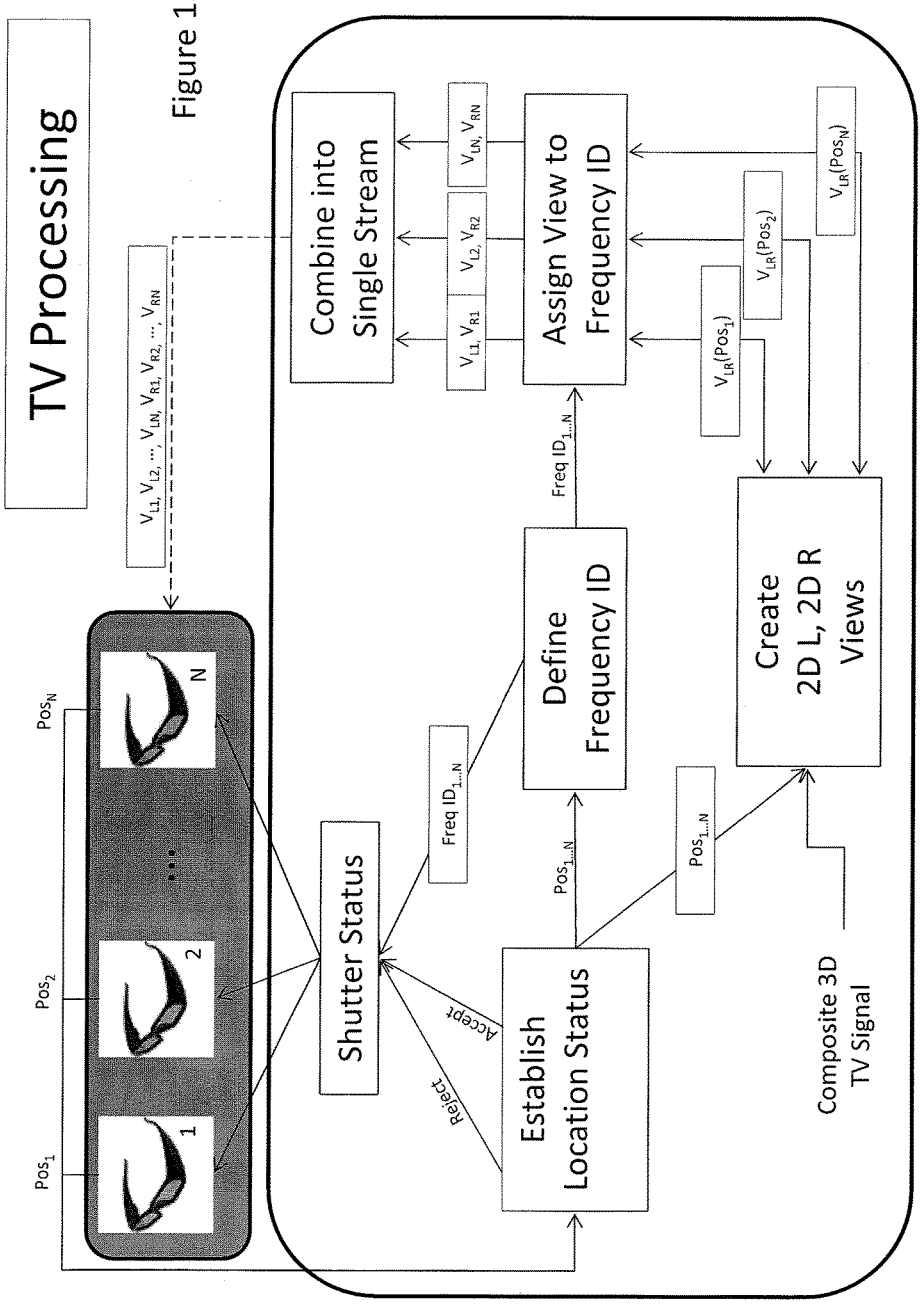
FIG. 13 is a part block diagram and a part schematic illustrating various functional blocks that perform multi-viewer presentation through a television display with a two way connection from the external shutter glasses to the television unit and back.

FIG. 13 is a part block diagram and a part schematic illustrating an example of an embodiment of a 3D viewing system that has various functional blocks that perform multi-viewer presentation through a television display with a two way connection from the external shutter glasses to the television unit and back. Each of the viewing devices can have a unique ID. The position (e.g., $Pos_1$, $Pos_2$, etc.) relative to the display (or 3D system) of each viewing device can determined, establishing a relationship between the viewing device ID and its position (for example, positions as illustrated in FIGS. 1-3). The position of the viewing device can determine which of the displayed images the viewing device should allow to be seen by synchronizing a shutter mechanism in the viewing device with displayed images of a seen having a certain perspective. A signal (e.g., a perspective view selector) can be transmitted to the viewing device that includes identification information and synchronization information for each or the viewing devices. The identification information can include ID data that each viewing device can use to determine which synchronization information should be used to control the shutter mechanism. The synchronization information related to particular ID data can include data that indicates when the left and right shutter of the viewing device, having the particular ID, should be opened and closed to allow images having a certain perspective view (e.g., based on the position of the viewing device) to be seen through the shutter, and images having a different perspective view to be obscured by the shutter. For example, in some embodiments the system can define certain frequency ID's, (e.g., one for each viewing device); the viewing devices receive this information from a transmitted signal (e.g., the perspective view selector) and use this information to operate left and right shutters of the viewing device so that the shutters are open during a certain frequency of the displayed signal. In other words, the shutters are operated so that the are open for a certain time period during the refresh cycle of the display. For example, for a display at 1320 Hz, eleven unique viewing device positions can be established, showing 60 Hz left images and 60 Hz right images for eleven different perspective views. FIG. 13 illustrates information that can be communicated between the functional blocks, where "$Pos_{1 \ldots N}$" refers to the positions of the viewers, for example, the positions of the viewing devices used by viewers to view displayed 3D images. Depending on the position of the viewing devices (or viewers), if the viewing devices are within the same viewing position zone, two or more viewing devices can receive synchronization information so that they both see the same displayed images. In some embodiments, the system can use a default number of a plurality of positions (e.g., two or more lateral positions, a combination of lateral, top, and bottom positions for a total of eleven positions, or more or less than eleven positions) which can obviate constantly establishing the location status of the viewing devices. In FIG. 13, "$V_{LR}$" refers to a left view and a right view (referring to stereoscopic conjugate images that can be displayed on a display device), "$V_{L1}$" (and "$V_{L\#}$") and "$V_{R1}$" (and "$V_{R\#}$") refers to 2D left views and 2D right views, respectively, that can be displayed. "$V_{LR}(Pos_\#)$" refers to a left view and a right view that are displayed for viewing by viewing devices in certain positions.

Figure 14:
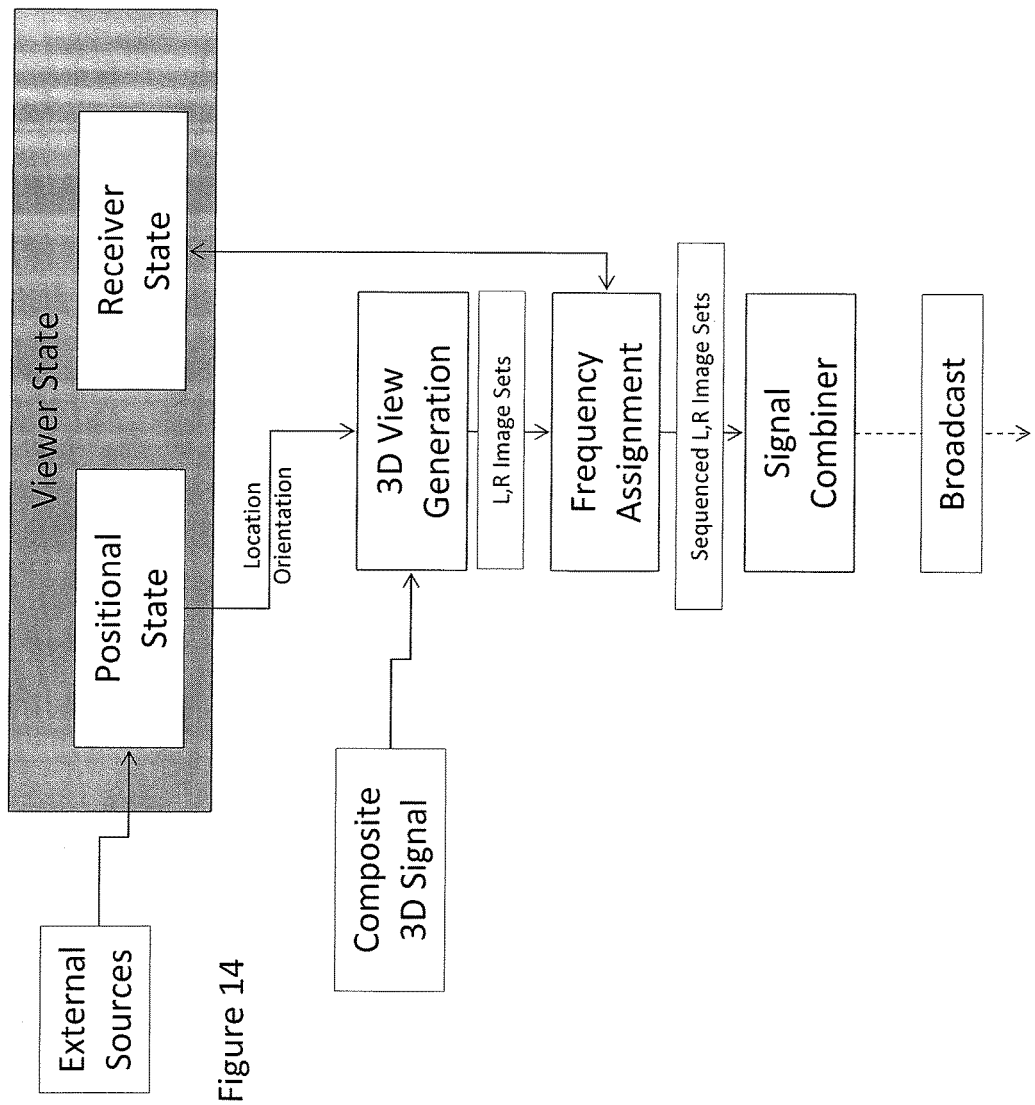
FIG. 14 is an illustration depicting embodiments of processing and methods, for example, for determining the positional state of viewing devices (or viewers), receiving 3D video content for display, 3D view generation, frequency assignment of the perspective views, signal combination, and broadcasting the combined signal to be received and used by a plurality of viewing devices.

FIG. 14 illustrates an example of a three dimensional display method in which multiple users can share the experience of watching a movie scene with different perspective views, allowing presentation on a display of video scenes to a set of viewers to have a true three dimensional movie experience. This method can include gathering viewer state information which can include positional information of the viewer location relative to the broadcast source and/or viewer orientation relative to the vertical and horizontal axis of the broadcast source. In some embodiments, this information can be determined through external sources (e.g., a camera and image recognition software). In some embodiments, this information is determined by either one-way or two-way communication between one or more viewing devices and a 3D display system. Having positional information (e.g., location, orientation) determined, a composite 3D signal is ingested and a plurality of left and right pair of stereo images are created based on the positional information provided. The generated stereo images are projected into a plane parallel with the viewing angle gathered from the viewer state information (e.g., on the display device). The generated stereo images are processed by a frequency assignment process that assigns each stereo image pair (left image, right image) to an individual frequency consistent with a viewing device (e.g., glasses having a shutter mechanism) receiver state. In some embodiments, the viewing device receiver state may be synchronized to account for additional viewers and changes in the assigned frequency. A signal combiner sequences the multiple stereo image pairs into a combined display video signal which is sent to a display device and displayed. A signal that can include viewing device identification information and synchronization information is transmitted to an area around the display device. Such a signal can be referred to as the perspective view selector. Each viewing device receives the transmitted signal and determines (e.g., independently) the correct image pair to be seen by that viewing device in the left eye viewer and right eye viewer based on the viewing device's ID and the synchronized frequency assignment. Based on the information a viewing device receives and its positional relationship with the display device, shuttering occurs for the left eye viewer and the right eye viewer of the viewing device corresponding to displayed stereoscopic conjugate image pairs representing one perspective view of the displayed scene.

In order to provide copyright protection for the movie contents, this invention contemplates the use of protection systems such as described in EMBEDDING AND DECODING THREE-DIMENSIONAL WATERMARKS INTO STEREOSCOPIC IMAGES, filed on Apr. 22, 2010, U.S. Patent Pub. No. 20100098326, which is incorporated herein by reference in its entirety.

While the various embodiments of the present invention have been described with reference to illustrative embodiments and example, this description is not intended to be construed in a limiting sense.

Various modifications of the illustrative embodiments, as well as other embodiments of the invention, will be apparent to persons skilled in the art upon reference to this description.

The invention claimed is:

1. A system for viewing stereoscopic images, comprising:
an image engine that generates a plurality of stereoscopic scenes for viewing on a single display, each stereoscopic scene comprising a plurality of at least two pairs of stereoscopic conjugate images, wherein each of said at least two pairs of stereoscopic conjugate images represents a different perspective view of said each stereoscopic scene, and each pair of the at least two pairs of stereoscopic conjugate images is displayed at an individual frequency;
a signal sync processor that assigns each pair of the at least two pairs of stereoscopic conjugate images to an individual frequency consistent with each of at least two viewing devices;
a glasses interface that receives information from at least two viewing devices; and
a signal generator that transmits a perspective view selector that contains identification and synchronization information of each of said plurality of at least two pairs of stereoscopic conjugate images of each scene that are available for viewing on the display.

2. The system of claim 1, further comprising the at least two viewing devices, wherein the at least two viewing devices are configured to receive the perspective view selector and use the perspective view selector to view a plurality of pairs of stereoscopic conjugate images on the display representing one perspective view of said each stereoscopic scene based on the position of each of the at least two viewing devices.

3. The system of claim 1, wherein said at least two pairs of stereoscopic conjugate images representing a different perspective view of said each stereoscopic scene include a first perspective view as seen from a right side of said each stereoscopic scene and second perspective view as seen from a left side of said each stereoscopic scene.

4. The system of claim 1, wherein said at least two pairs of stereoscopic conjugate images representing a different perspective view of said each stereoscopic scene include a first perspective view and a second perspective view, and wherein each of said first perspective view and said second perspective view each being a perspective view as seen from one of a left side of said each stereoscopic scene, a right side of said each stereoscopic scene, a front of said each stereoscopic scene, a top of said each stereoscopic scene, or a bottom of said each stereoscopic scene.

5. The system of claim 1, wherein said image engine is configured to generate at least ten stereoscopic scenes per second.

6. The system of claim 1, further comprising the display, the display in communication with said image engine and configured to receive and display said plurality of stereoscopic scenes.

7. A system for viewing stereoscopic images, comprising:
an image engine that generates a plurality of stereoscopic scenes, each said scene comprising at least two pairs of stereoscopic conjugate images and each of said at least two pairs of stereoscopic conjugate images representing one of a plurality of different perspective views of said scene;
a signal sync processor that assigns each pair of the at least two pairs of stereoscopic conjugate images to an individual frequency consistent with each of at least two viewing devices;
a signal generator that transmits a perspective view selecting signal that contains information for said each of said at least two pairs of stereoscopic conjugate images representing one of a plurality of different perspective views of said scene; and
at least two viewing devices, each viewing device comprising
a pair of glasses each having a shuttering mechanism that synchronizes with displayed pairs of images, shown on the display at an assigned frequency, corresponding to one of the perspective views,
wherein each of said at least two viewing devices independently selects one of said plurality of different perspective views displayed on the display device based on the position of said each viewing device.

8. The system of claim 7, further comprising a receiver that receives said perspective view selecting signal and selects only one perspective view of said pair of stereoscopic conjugate images for viewing on the display device.

9. The system of claim 7, further comprising the display device, the display device in communication with said image engine and configured to receive and display said plurality of stereoscopic scenes.

10. The system of claim 9, wherein the position of each said each viewing device is the position of each of said viewing device relative to the display device.

11. The system of claim 7, wherein said information of the perspective view selecting signal includes identification and synchronization information.

* * * * *